United States Patent
Lindstrom

(10) Patent No.: US 8,286,584 B2
(45) Date of Patent: Oct. 16, 2012

(54) ARRANGEMENT AND METHOD FOR IMPROVING THROUGHPUT IN A ROTARY MILKING SYSTEM

(75) Inventor: Krister Lindstrom, Alvsjo (SE)

(73) Assignee: DeLaval Holding AB, Tumba (SE)

( * ) Notice: Subject to any disclaimer, the term of this patent is extended or adjusted under 35 U.S.C. 154(b) by 207 days.

(21) Appl. No.: 12/812,696

(22) PCT Filed: Jan. 16, 2009

(86) PCT No.: PCT/SE2009/050038
§ 371 (c)(1),
(2), (4) Date: Jul. 13, 2010

(87) PCT Pub. No.: WO2009/093964
PCT Pub. Date: Jul. 30, 2009

(65) Prior Publication Data
US 2010/0282171 A1    Nov. 11, 2010

(30) Foreign Application Priority Data
Jan. 22, 2008    (SE) ........................................ 0800150

(51) Int. Cl.
*A01J 5/007*    (2006.01)
*A01J 5/00*    (2006.01)

(52) U.S. Cl. .................. 119/14.02; 119/14.04

(58) Field of Classification Search ............... 119/14.02, 119/14.01, 14.03, 14.04, 14.08, 14.14; *A01J 5/07, A01J 5/00*
See application file for complete search history.

(56) References Cited

U.S. PATENT DOCUMENTS

| | | | |
|---|---|---|---|
| 5,782,199 A | 7/1998 | Oosterling | |
| 5,784,993 A | 7/1998 | Osthues et al. | |
| 6,050,219 A | 4/2000 | Van Der Lely | |
| 6,520,112 B2 | 2/2003 | Van Der Lely | |
| 6,883,461 B2 | 4/2005 | Christensen | |
| 2002/0000204 A1 | 1/2002 | Van Der Lely | |
| 2002/0033138 A1 | 3/2002 | Brayer | |
| 2003/0150389 A1 | 8/2003 | Christensen | |
| 2009/0320758 A1* | 12/2009 | Barba et al. ................ | 119/14.02 |
| 2010/0180824 A1* | 7/2010 | Bright et al. ................ | 119/14.08 |

FOREIGN PATENT DOCUMENTS

| | | |
|---|---|---|
| DE | 4330894 | 1/1995 |
| EP | 1474970 | 11/2004 |
| WO | WO 0145496 | 6/2001 |
| WO | WO 0219806 | 3/2002 |
| WO | WO 2008031802 | 3/2008 |

OTHER PUBLICATIONS

International Search Report, PCT/SE2009/050038, Apr. 22, 2009.

* cited by examiner

*Primary Examiner* — Son T Nguyen
*Assistant Examiner* — Shadi Baniani
(74) *Attorney, Agent, or Firm* — Young & Thompson

(57) ABSTRACT

A method for improving the throughput of milking animals in a rotary milking system including a rotary platform, which milking animals enter and leave in a sequential order in order to be milked provides that a plurality of milking animals to be milked by the rotary milking system are identified; a measure indicative of the expected time required for performing at least one action on the rotary platform with respect to each of the milking animals is retrieved; and the milking animals are allowed to enter the rotary platform of the rotary milking system in an order, which is based on the measures indicative of the expected times required for performing the at least one action on the rotary platform with respect to the milking animals.

6 Claims, 2 Drawing Sheets

ARRANGEMENT AND METHOD FOR IMPROVING THROUGHPUT IN A ROTARY MILKING SYSTEM

TECHNICAL FIELD OF THE INVENTION

The present invention generally relates to dairy farming. More specifically the invention relates to an arrangement and a method for improving throughput in a rotary milking system.

DESCRIPTION OF RELATED ART AND BACKGROUND OF THE INVENTION

A rotary milking system comprises a rotary platform, which milking animals enter and leave in a sequential order in order to be milked. The rotary platform comprises a plurality of milking stalls, each provided with milking equipment for milking of a milking animal present in the milking stall. The rotary platform rotates with the milking stalls and the milking animals, which have entered the rotary platform, slowly with a rotational speed adapted to the required milking times for the milking animals being milked so that each milking animal has been entirely milked when the milking animal has been rotated almost one full revolution.

In a semi-automated or fully automated rotary milking system, teat cups of the milking equipments are automatically attached to the teats of the milking animals to be milked by a robot arm provided with a gripper. One single robot arm may serve all or at least several milking stalls of the rotary milking system.

SUMMARY OF THE INVENTION

Rotary milking systems of the above kind involve heavy expenditure and have a limited milk production capacity. The milk production capacity depends, inter alia, on the throughput of milking animals and a limited throughput restricts the overall milk production. One shortcoming of the rotary milking systems is that the throughput is low since the rotational speed is set by the milking animal that has the longest milk time of the milking animals present on the rotary platform. As a consequence several milking animals occupy milking stalls for an unnecessarily long time while awaiting a sufficient rotation of the rotary platform in order to be able to leave the rotary platform.

The above shortcoming is alleviated by an arrangement and a method for improving the throughput of milking animals in accordance with the appended patent claims.

According to a first aspect of the invention there is provided an arrangement comprising identifying means for identifying milking animals to be milked by the rotary milking system; a control device arranged to retrieve a measure indicative of the expected time required for performing at least one action on the rotary platform with respect to each of the milking animals; and a selection or sorting gate arrangement for allowing the milking animals to enter the rotary platform of the rotary milking system in an order, which is based on the measures indicative of the expected times required for performing the at least one action on the rotary platform with respect to the milking animals. The arrangement may be fully automated or semi-automated.

By means of the present invention an arrangement is obtained, which is capable of reducing the total milking time for a herd of milking animals, thus increasing the throughput of milking animals in the milking system.

In one embodiment the selection or sorting gate arrangement is arranged to allow each of the milking animals which has a measure M indicative of the expected time required for performing the at least one action on the rotary platform with respect to the milking animal that is below a threshold T (i.e. M<T) to enter the rotary platform first, and to allow each of the remaining ones of the milking animals to enter the rotary platform thereafter. Preferably the latter milking animals are kept in a waiting area while the former ones are entering the rotary platform. Typically, in order to operate properly in a practical situation the measures and/or threshold can be set such that only a smaller fraction of the milking animals are sorted out and have to wait for the former milking animals to enter the rotary platform before being allowed to enter the rotary platform. The fraction may be e.g. 1-20%.

In another embodiment the milking animals having the longest milk times are milked first. The selection or sorting gate arrangement is thus arranged to allow each of the milking animals which has a measure M indicative of the expected time required for performing the at least one action on the rotary platform with respect to the milking animal that is above a threshold T (i.e. M>T) to enter the rotary platform first, and to allow each of the remaining ones of the milking animals to enter the rotary platform thereafter.

In a more generalized embodiment, the selection or sorting gate arrangement can be arranged to divide up the milking animals in different groups depending on the expected times required for performing the at least one action. One of the groups of milking animals is guided directly to the rotary platform and each of the remaining groups of milking animals is guided to a respective waiting area. When the first group of milking animals has entered the rotary platform each of the remaining groups of milking animals is sequentially guided from the respective waiting area to the rotary platform. The order in which the groups of milking animals are guided to the rotary platform is based on the above measures.

The more groups that are used, the faster the milking can be made and the higher throughput will be achieved. However, the arrangement will be more complex and expensive and the sorting of milking animals will take longer time.

For each of the milking animals, the expected time required for performing the at least one action on the rotary platform with respect to the milking animal may be (i) the total expected time the milking animal is required to be on the rotary platform in order to be milked, (ii) the expected time for attaching teat cups to the milking animal, or (iii) the expected time for milking the milking animal.

According to a second aspect of the invention there is provided a method according to which milking animals to be milked by the rotary milking system are identified; a measure indicative of the expected time required for performing at least one action on the rotary platform with respect to each of the milking animals is retrieved; and the milking animals are allowed to enter the rotary platform of the rotary milking system in an order, which is based on the measures indicative of the expected times required for performing the at least one action on the rotary platform with respect to the milking animals.

The method is preferably implemented by an arrangement according to the first aspect, but can be implemented in other manners. Some or several of the steps may e.g. be performed partly or entirely manually.

Further characteristics of the invention, and advantages thereof will be evident from the following detailed description of preferred embodiments of the present invention given hereinafter, and the accompanying FIGS. 1-3, which are given by way of illustration only, and are thus not limitative of the present invention.

DETAILED DESCRIPTION OF EMBODIMENTS

Figure 1:
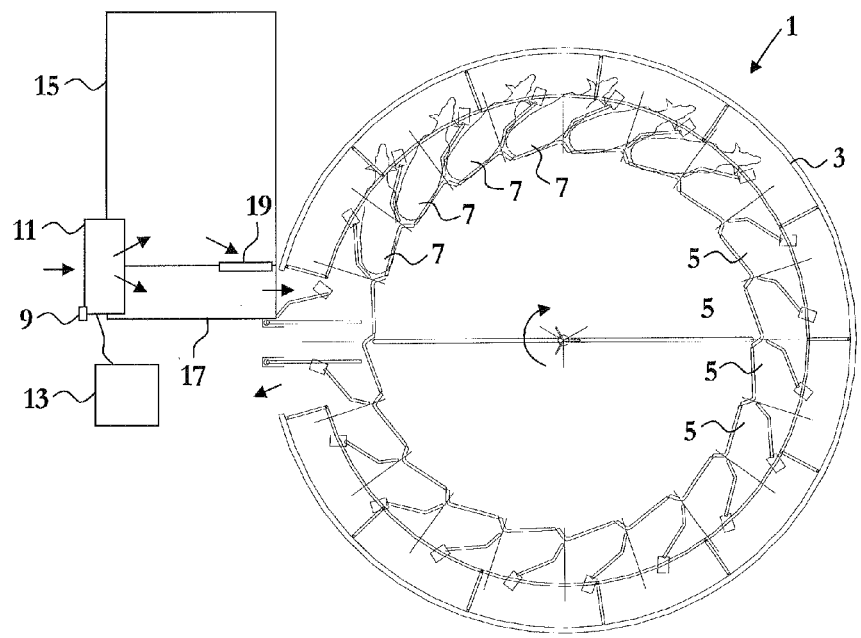
FIGS. 1 and 2 each schematically display a rotary milking system including an arrangement for improving throughput according to an embodiment of the present invention.

In FIG. 1 is shown a rotary milking system 1 comprising a rotary platform 3, which milking animals 7 enter and leave in a sequential order in order to be milked. The rotary platform 3 comprises a number of milking stalls 5, each being provided with milking equipment (not illustrated) for milking a milking animal 7 housed in the milking stall 5 during one revolution of the rotary platform 3. The rotary milking system 1 of FIG. 1 comprises 20 milking stalls 5, but other rotary milking systems which can be used with the present invention comprises other numbers of milking stalls. Further, while FIG. 1 shows a rotary milking system in herringbone configuration, the invention is applicable to other kind of configurations such as parallel and tandem configurations.

The rotary platform 3 is rotated during milking of the milking animals 7 present in the milking stalls 5 in a clockwise manner as illustrated by the arrow in the center of the rotary platform 3. The rotational speed can typically be altered dynamically so that each milking animal can be milked completely during one revolution of the rotary platform 3. If required, the rotary platform can be halted when a milking animal enters the rotary platform and optionally when teat cups of the milking equipment is attached to the teats of the milking animal which has just entered the rotary platform. The teat cups can be attached manually or by a robot arm (not illustrated) provided with a gripper. One single robot arm may serve all or at least several milking stalls of the rotary milking system.

The rotary milking system 1 comprises a central control and process apparatus (not illustrated) for controlling various parts of the rotary milking system 1 such as the movement of the rotary platform 3 and the operation of the milking equipments of the milking stalls 5, and for gathering information such as milk yields and milking times for each of the milking animals 7.

According to the invention an arrangement for improving the throughput of milking animals in the rotary milking system 1 comprises an identifying device 9, a sorting or selecting gate arrangement 11, a control device 13, an enclosed waiting area 15, a passage way 17, and a gate arrangement 19 arranged between the waiting area 15 and the passage way 17.

The identifying device 9 is arranged to identify milking animals to be milked by the rotary milking system as they present themselves voluntarily at, or are guided, forced or enticed to visit, the rotary milking system 1, one after the other.

The control device 13 is arranged to retrieve a measure indicative of the expected time required for performing at least one action on the rotary platform 3 with respect to each of the milking animals 7. This can be made by referring to the central control and process apparatus, or if the control device 13 is integrated with the central control and process apparatus, by referring to a memory of that apparatus.

The measure may, for each of the milking animals, be indicative of the expected time for milking the milking animal, but is more preferably indicative of the expected total time the milking animal needs to be on the rotary platform in order to be properly milked by the rotary milking system. Such expected total time is an expected time for pre-milking treatment of the milking animal (if any), for milking the milking animal, and for post-milking treatment of the milking animal (if any).

The time for pre-milking treatment may, for each of the milking animals, include an expected time for attachment of teat cups to the teats of the milking animal, particularly if this is performed automatically by a robot arm, since this time may differ considerably from animal to animal.

In one version the measure indicative of the expected time required for performing at least one action on the rotary platform with respect to each of the milking animals is a measure indicative of the expected time for attachment of teat cups to the teats of the milking animal. Such version may be advantageous if it is the attachment of teat cups and not the milking itself which is the action limiting the rotational speed of the rotating platform and thus the throughput of milking animals.

The expected milking time, the expected time for pre-milking treatment, the expected time for attachment of teat cups to the teats of the milking animal, the expected time for post-milking treatment, and the expected total time the milking animal needs to be on the rotary platform in order to be properly milked may be calculated to be identical to the respective time lapsed last time the milking animal was pre-milking treated, had teat cups attached to its teats, was milked, was post-milking treated, and was on the platform. However, more suitably, averages are calculated from the last milkings of the milking animal. Optionally, the expected milking time can be influenced by where in the lactation phase the milking animal is, her health, etc. How to calculate expected milking times and pre-milking and post-milking treatment times will not be further discussed here. There are many published documents on the subject.

The sorting or selecting gate arrangement 11 is arranged to allow the milking animals 7 to enter the rotary platform 3 of the rotary milking system 1 in an order, which is based on the measures indicative of the expected time required for performing the at least one action on the rotary platform with respect to the milking animals.

This can be achieved in the following manner. If a milking animal has a measure M indicative of the expected time required for performing the at least one action on the rotary platform that is below a threshold T, that is, M<T, the sorting or selecting gate arrangement 11 opens a passage so that the milking animal can directly access the passage way 17 and the rotary platform 3. If the milking animal has a measure M indicative of the expected time required for performing the at least one action on the rotary platform that is above the threshold T, that is, M>T, the sorting or selecting gate arrangement 11 opens a passage so that the milking animal will be given access to the waiting area 15. This is repeated for all milking animals to be milked.

As a consequence, all milking animals that have a measure indicative of the expected time required for performing the at least one action on the rotary platform with respect to the milking animal that is below the threshold will be allowed to enter the rotary platform first. When all such milking animals have entered the rotary platform 3, the milking animals that were guided to the waiting area 15 are allowed to enter the rotary platform 3 by opening of the gate arrangement 19.

Both the sorting or selecting gate arrangement 11 and the gate arrangement 19 can be operated automatically under control of the control device 13. The traffic of milking animals through the inventive arrangement and the rotary milking system 1 is indicated by arrows.

For practical reasons the threshold is typically set so that a smaller fraction of the milking animals will have a measure M that is above the threshold T so that only a fraction, e.g. 1-20%, of the milking animals will be gathered in the waiting area 15. Hereby the waiting area 15 does not have to be very large, and less time will be lost for sorting of milking animals, that is, a continuous flow of milking animals to the rotary platform 3 is guaranteed.

As an alternative approach the sorting or selecting gate arrangement 11 is arranged to first allow each of the milking animals which has a measure M indicative of the expected time required for performing the at least one action on the rotary platform with respect to the milking animal that is above a threshold T, that is, M>T, to enter the rotary platform 3 and to thereafter allow each of the remaining ones of the milking animals to enter the rotary platform 3. While such approach is quite feasible, it seems that the former approach is more time efficient.

Figure 2:
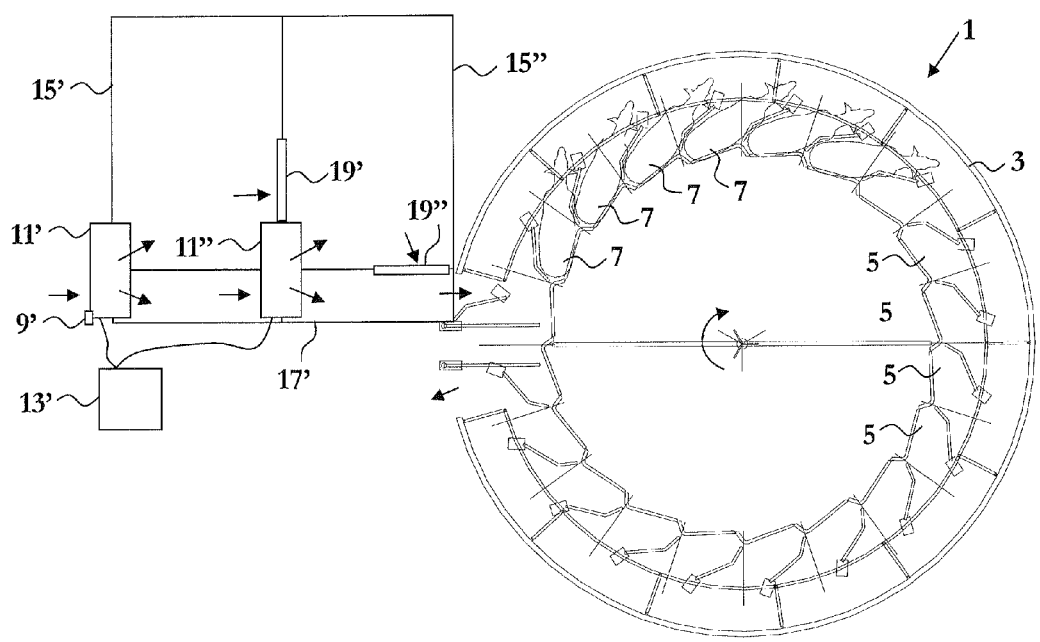

With reference next to FIG. 2 a further embodiment of the arrangement of the present invention will be described. Here, the arrangement comprises an identifying device 9' at the entry to the arrangement, first and second serially arranged sorting or selecting gate arrangements 11' and 11", a control device 13', first and second enclosed waiting areas 15' and 15", a passage way 17', and first and second gate arrangements 19' and 19". The arrangement operates in the following manner.

The control device 13' retrieves the measures indicative of the expected times required for performing the at least one action on the rotary platform with respect to the milking animals.

If a milking animal has a measure M indicative of the expected time required for performing the at least one action on the rotary platform that is below a first threshold T1, that is, M<T1, the first sorting or selecting gate arrangement 11' opens a passage so that the milking animal can access the passage way 17' and access the second sorting or selecting gate arrangement 11". If the milking animal has a measure M indicative of the expected time required for performing the at least one action on the rotary platform that is above the first threshold T1, that is M>T1, the first sorting or selecting gate arrangement 11' opens a passage so that the milking animal will be given access to the first waiting area 15'.

If the milking animal is allowed to access the second sorting or selecting gate arrangement 11', and the milking animal has a measure M indicative of the expected time required for performing the at least one action on the rotary platform that is also below a second threshold T2 lower than the first threshold T1, that is, M<T2<T1, the second sorting or selecting gate arrangement 11" opens a passage so that the milking animal can directly access the rotary platform 3. If however, the milking animal at the second sorting or selecting gate arrangement 11' has a measure M that is above the second threshold T2, that is T2<M<T1, the second sorting or selecting gate arrangement 11" opens a passage so that the milking animal will be given access to the second waiting area 15".

This is repeated for all milking animals to be milked. As a consequence, all milking animals that have a measure indicative of the expected time required for performing the at least one action on the rotary platform with respect to the milking animal that is below both the first and second thresholds will be allowed to enter the rotary platform first. When all such milking animals have entered the rotary platform 3, the milking animals that were guided to the second waiting area 15" are allowed to enter the rotary platform 3 by opening of the second gate arrangement 19". Finally, when all milking animals in the second waiting area 19" have entered the rotary platform 3, the milking animals that were guided to the first waiting area 15' are allowed to enter the rotary platform 3 by opening of the first gate arrangement 19' while keeping the second gate arrangement 19" open.

The first and second sorting or selecting gate arrangements 11' and 11" and the first and second gate arrangements 19' and 19" can be operated automatically under control of the control device 13'. The traffic of milking animals through the inventive arrangement and the rotary milking system 1 is indicated by arrows.

Note that all conditional openings of the first and second sorting or selecting gate arrangements 11' and 11" can be changed such that the milking animals having the longest expected times on the rotary platform will be allowed to enter the rotary platform first instead.

The above embodiment can be further generalized by adding further sorting or selecting gate arrangements, gate arrangements and waiting areas (not illustrated). Such arrangement is arranged to divide up the milking animals in N+1 different groups depending on the measures indicative of the expected times required for performing the at least one action on the rotary platform with respect to the milking animals by means of using a number of thresholds T1>T2> . . . >TN−1>TN. Milking animals of group 1 will have measures M indicative of the expected time required for performing the at least one action on the rotary platform with respect to the milking animals that fulfills M<TN, milking animals of group 2 will have measures M that fulfills TN<M<TN−1, etc. and milking animals of group N+1 will have measures M that fulfills M>T1.

The milking animals of group 1 will be allowed to enter the rotary platform first, the milking animals of group 2 will thereafter be allowed to enter the rotary platform, etc. and the milking animals of group N+1 will be allowed to enter the rotary platform last.

The order in which the groups of milking animals are allowed to enter the rotary platform can alternatively be reversed (as in previous embodiments).

It shall be appreciated by a person skilled in the art that the highest throughput of milking animals in the rotary milking system is achieved if the number of groups is identical to the number of milking animals to be milked and the thresholds are set so that each group will comprise a single milking animal. Such approach is identical with putting each of the milking animals in an increasing (or decreasing) order with respect to their measures indicative of the expected times required for performing the at least one action on the rotary platform with respect to the milking animals and to allow them to enter the rotary platform in that order. While such sophisticated approach would require complex and expensive equipment and the sorting of the milking animals would take considerable time, it is possible to realize.

Figure 3:
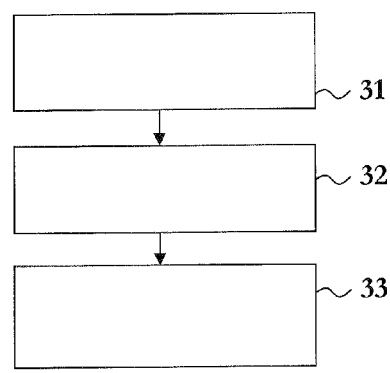
FIG. 3 is a flow chart of a method for improving throughput according to an embodiment of the present invention.

FIG. 3 is a flow chart of a method for improving throughput according to an embodiment of the present invention. According to the method milking animals to be milked by the rotary milking system are, in a step 31, identified before entering the rotary milking system. A measure indicative of the expected time required for performing at least one action on the rotary platform with respect to each of the milking animals is, in a step 32, retrieved. Finally, the milking animals are, in a step 33, allowed to enter the rotary platform of the rotary milking system in an order, which is based on the measures indicative of the expected times required for performing the at least one action on the rotary platform with respect to the milking animals.

Preferably, the milking animals that have the longest expected milking times are sorted out and are milked after the other milking animals.

The method is preferably implemented by an arrangement according to any of the arrangement embodiments of the present invention, but can be implemented in other manners. Some or several of the steps may e.g. be performed partly or entirely manually. For instance, the measure indicative of the expected time required for performing the at least one action on the rotary platform with respect to each of the milking animals may be retrieved manually and/or gate arrangements or other guiding means, forcing means, or enticing means may be operated manually in order to allow/guide/force/entice the milking animals to enter the rotary platform of the rotary milking system in an order, which is based on the measures indicative of the expected times required for performing the at least one action on the rotary platform with respect to the milking animals.

The invention claimed is:

1. A method for improving the throughput of milking animals being milked in a rotary milking system (1) comprising a rotary platform (3), which milking animals (7) enter and leave in a sequential order in order to be milked, comprising the steps of:
   presenting a plurality of milking animals to the rotary milking system, the plural milking animals being comprised of different groups of milking animals, each group of milking animals having a different expected time required for performing milking on the rotary platform;
   after presenting the plurality of milking animals to the rotary milking system, dividing the plurality of milking animals into i) a first group of milking animals to be guided first to the rotary platform for milking, and ii) remaining milking animals to be guided to a waiting area for milking after the first group of milking animals have been milked,
   wherein said dividing step comprises, for each milking animal of the plurality of milking animals, i) retrieving a measure indicative of the expected time required for performing milking on the rotary platform, ii) for milking animals having retrieved measures indicating the first group of milking animals, guiding the milking animals of the first group to the rotary platform for milking, and iii) for the remaining milking animals having retrieved measures indicating a remaining group other than the first group of milking animals, guiding the remaining milking animals of the remaining group into the waiting area; and
   subsequent to milking the first group of milking animals, guiding the remaining milking animals of the remaining group from the waiting area to the rotary platform for milking.

2. The method of claim 1, wherein,
the retrieved measure from each of the milking animals indicative of the expected time required for performing milking on the rotary platform for the first group of milking animals is below a threshold T, and
the retrieved measure from each of the milking animals indicating the remaining group of milking animals is not below the threshold T.

3. The method of claim 1, wherein,
the retrieved measure from each of the milking animals indicative of the expected time required for performing milking on the rotary platform for the first group of milking animals is above a threshold T, and
the retrieved measure from each of the milking animals indicating the remaining group of milking animals is not above the threshold T.

4. The method of claim 1, wherein,
said waiting area comprises a first waiting area and a second waiting area, and
said step of guiding the remaining milking animals of the remaining group comprises the steps of:
   i) dividing the remaining milking animals of the remaining group into a first-remaining group and a second-remaining group based on the respective different retrieved measures indicative of the different expected times required for performing milking on the rotary platform,
   ii) guiding the first-remaining group to the first waiting area, the first-remaining group of milking animals waiting in the first waiting area for milking after the second-remaining group of milking animals have been milked,
   iii) guiding the second-remaining group to the second waiting area, the second-remaining group of milking animals waiting in the second waiting area for milking after the first group of milking animals have been milked,
   iv) after milking the first group of milking animals, guiding the second-remaining group to the rotary platform for milking; and
   v) after milking the second-remaining group of milking animals, guiding the first-remaining group to the rotary platform for milking.

5. The method of claim 4, wherein,
the method uses a first threshold T1 and a second threshold T2, the second threshold T2 being a time less the first threshold T1,
the retrieved measure from each of the milking animals indicative of the expected time required for performing milking on the rotary platform for the first group of milking animals is below a second threshold T2,
the retrieved measure from each of the milking animals indicating the first-remaining group of milking animals is above the first threshold T1, and
the retrieved measure from each of the milking animals indicating the second-remaining group of milking animals is above the second threshold T2 and below the first threshold T1.

6. The method of claim 1, wherein the presenting of the plurality of milking animals to the rotary milking system is by one of the group consisting of
   i) the milking animals voluntarily presenting themselves to the rotary milking system,
   ii) the milking animals being guided to the rotary milking system,
   iii) the milking animals being forced to the rotary milking system, and
   iv) the milking animals being enticed to the rotary milking system.

* * * * *